United States Patent [19]

Inatsuki

[11] Patent Number: 4,611,907
[45] Date of Patent: Sep. 16, 1986

[54] METHOD OF JUDGING FILM FRAME POSITION

[75] Inventor: Kenichi Inatsuki, Kanagawa, Japan

[73] Assignee: Fuji Photo Film Co., Ltd., Kanagawa, Japan

[21] Appl. No.: 741,328

[22] Filed: Jun. 4, 1985

[30] Foreign Application Priority Data

Jun. 5, 1984 [JP] Japan ................................ 59-115253

[51] Int. Cl.$^4$ ............................................ G03B 27/52
[52] U.S. Cl. ...................................... 355/41; 355/77; 250/557; 250/571
[58] Field of Search ....................... 355/68, 77, 41, 40; 250/227, 560, 561, 571, 557

[56] References Cited

U.S. PATENT DOCUMENTS

| | | |
|---|---|---|
| 3,469,480 | 9/1969 | Nassenstein et al. ................. 250/571 |
| 3,584,224 | 6/1971 | Harlem .................................. 250/561 |
| 4,544,842 | 10/1985 | Engemann et al. .................. 250/227 |

Primary Examiner—Michael L. Gellner
Assistant Examiner—D. Rutledge
Attorney, Agent, or Firm—Sughrue, Mion, Zinn, Macpeak, and Seas

[57] ABSTRACT

Disclosed is a film frame position judging method in which film densities are detected by a plurality of sensors disposed such as to be orthogonal to the direction in which a developed film is conveyed, and a frame edge is declared when the distance between the positions at which the OR (logical sum) of light/dark binary signals and the AND (logical product) of the binary signals respectively change as the film is conveyed is within a predetermined value, the light/dark binary signals respectively representing the densities at the detecting points on the film. Accordingly, it is possible to judge a frame position by detecting only one of the film frame edges and to increase the degree of accuracy in judging a frame position.

20 Claims, 23 Drawing Figures

(A) DENSITY (B) MEASURED DENSITY (C) MEASURED DENSITY

(D) DIFFERENCE BETWEEN BOTH MEASURED DENSITIES

FIG. 8

(A) DENSITY 
POSITION (B) MEASURED DENSITY 
POSITION (C) MEASURED DENSITY 
POSITION

(D) DIFFERENCE BETWEEN BOTH MEASURED DENSITIES 
POSITION

METHOD OF JUDGING FILM FRAME POSITION

BACKGROUND OF THE INVENTION

1. Field of the Invention:

The present invention relates to a method of automatically judging a film frame position.

2. Description of the Prior Art:

In a typical conventional method of judging a film frame position, a plurality of photosensors are disposed in a direction orthogonal to the longitudinal direction of a film, and the degree of density at each of the measuring points on the film is represented by each of the light/dark binary signals in accordance with the quantity of light passing through the film and received by each of the photosensors. Then, the OR (logical sum) of the binary signals is obtained, and when an OR changing width which is obtained when the film is conveyed in its longitudinal direction takes a value in the vicinity of a predetermined value (e.g., 36 mm), a frame position is declared.

However, such a judging method requires the detection of edges at both ends of a frame in the longitudinal direction of the film and it is not therefore possible by this method to detect a frame position when one of the frame edges is insufficiently clear.

On the other hand, if the light-receiving area of each of the photosensors is reduced for the purpose of increasing the resolving power, then it becomes impossible for a frame edge to be regarded as a straight line, and in such a case, the above-described method may lead to a misjudgement of the type wherein, for example, a portion of the film outside an actual edge is judged to be a frame edge. For this reason, it is not possible to increase the degree of accuracy in judgement of a frame position simply by improving the resolving power of each of the photosensors.

SUMMARY OF THE INVENTION

In view of the above-described fact, it is a primary object of the present invention to provide a method of judging a film frame position by which it is possible for a frame position to be properly judged even when one of the frame edges is insufficiently clear, and wherein it is possible to increase the accuracy of frame position judgement.

To this end, the present invention provides a film frame position judging method in which a frame position is declared when the distance between the positions at which the OR (logical sum) and AND (logical product) of light/dark binary signals respectively change as the film is conveyed is within a predetermined value, the light/dark binary signals respectively representing the degrees of density at points on the film where a plurality of sensors effect density detection, and the sensors being disposed in a direction orthogonal to the film conveying direction.

Accordingly, it is possible to judge a frame position by detecting only one of the frame edges and to increase the degree of accuracy in judging a frame position.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

One embodiment of the present invention will be described hereinunder with reference to the accompanying drawings.

Figure 1:
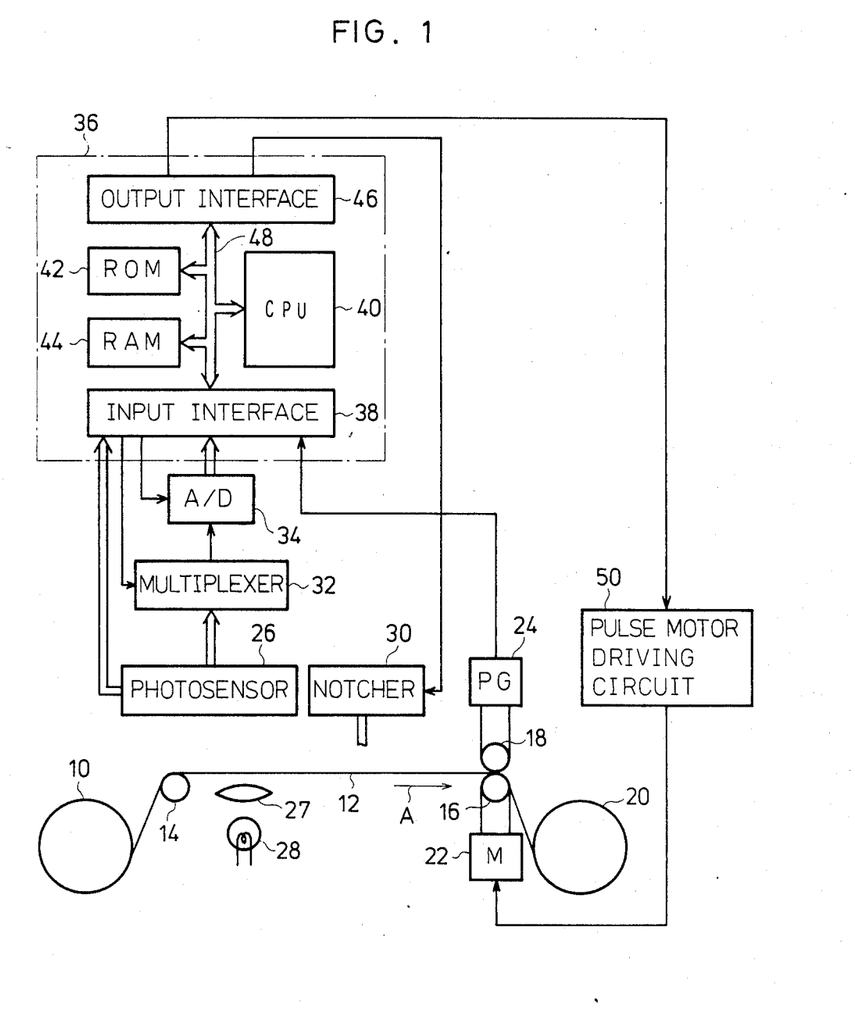
FIG. 1 is a block diagram of the whole arrangement of one embodiment of the present invention.

Referring first to FIG. 1, a developed negative film 12 wound on a reel 10 is guided by a guide roller 14 and clamped between a drive roller 16 and a press roller 18 and is then wound up on a reel 20. The drive roller 16 is driven by a pulse motor 22. A predetermined torque is applied to the reel 20 in its wind-up direction by a torque motor, not shown. The rotational phase of the press roller 18 is detected by a pulse generator 24. More specifically, the pulse generator 24 outputs one pulse signal every time the press roller 18 rotates a predetermined angle.

It is to be noted that the feed amount of the film 12 may be detected in such a manner that a timing code formed on the film 12 by light exposure or notching is optically detected, and a pulse signal obtained by this detection is employed as a timing signal.

A photosensor 26 detects information about a drive position and information employed to make judgement, for example, as to whether an image carried by a film frame is in or out of focus. The photosensor 26 is disposed such as to oppose a light source 28 across a lens 27 and the film 12. The light from the light source 28 is passed through the lens 27 so as to become parallel rays which are then passed through the film 12. A notcher 30 is disposed on the side of the photosensor 26 which is closer to the reel 20 in such a manner that the notcher 30 opposes the film 12. The notcher 30 is able to notch a film edge portion.

Film density detection signals from the photosensor 26 are partially input to an input interface 38 incorporated in a microcomputer 36 through a multiplexer 32 and an A/D converter 34. On the other hand, the remaining film density detection signals are directly input to the input interface 38. The microcomputer 36 incorporates a central processing unit (CPU) 40, a read-only memory (ROM) 42, a random-access memory (RAM) 44 and an output interface 46 in addition to the input interface 38. These devices are interconnected by a bus 48. To the input interface 38 is further input a signal from the pulse generator 24. From the output interface 46 control signals are respectively output to the notcher 30 and a pulse motor driving circuit 50.

The pulse motor driving circuit 50 prepares a pulse signal whose frequency gradually increases to a predetermined value when its input signal is raised to an ON state and further outputs a synchronizing signal to each of the coils of the pulse motor 22 on the basis of the prepared pulse signal. It is to be noted that this pulse signal may be prepared by the microcomputer 36 in a software manner.

Figure 2:
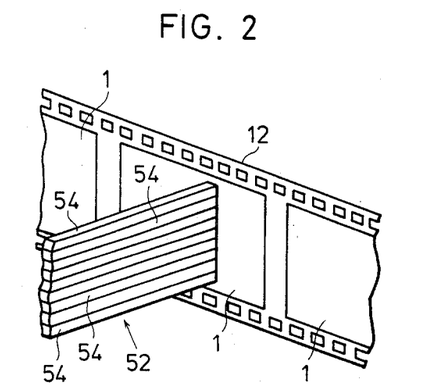
FIG. 2 is a perspective view of a part of the detection unit of the photosensor shown in FIG. 1.
Figure 3:
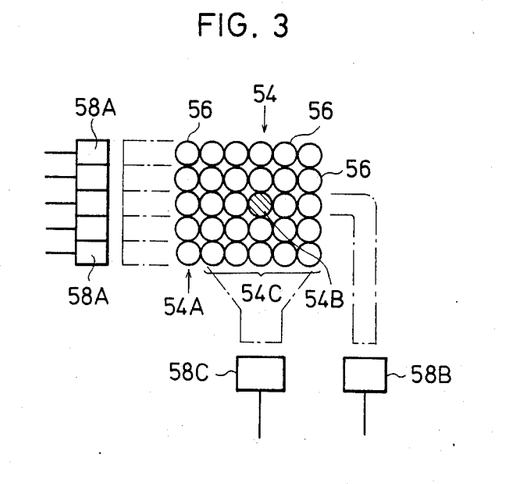
FIG. 3 is a view employed to describe the relationship between the distal end face of one block of the detection unit shown in FIG. 2 and light receivers.

Referring next to FIG. 2, the photosensor 26 has a detection section 52 which is constituted by a plurality (r number) of spot detection units 54 which are disposed in such a manner that their respective longitudinal axes extend in a direction orthogonal to the longitudinal direction of the film 12. Each of the spot detection units 54 is, as shown in FIG. 3, constituted by a plurality of optical fibers 56 which are bonded and bundled together such as to have a rectangular shape in cross-section. The first row of the optical fibers 56 on the left-hand side as viewed in FIG. 3 constitute in combination a frame edge detection portion 54A. The light guided by each of the optical fibers 56 is received by a light receiver 58A constituted by employing a phototransistor. Only when the quantity of the received light exceeds a predetermined value a signal is output from the light receiver 58A and supplied to the input interface 38. A small-spot detection portion 54B located at the center of the spot detection unit 54 and shown by oblique lines in FIG. 3 is adapted to detect the density at a small spot. The remaining optical fibers 56 constituting the spot detection unit 54, exclusive of the one described above, constitute in combination a large-spot detection portion 54C. The light guided by the optical fiber 56 constituting the small-spot detection portion 54B is received by a small-spot light receiver 58B, while the light guided by the optical fibers 56 constituting the large-spot detection portion 54C is entirely received by a large-spot light receiver 58C. The light receivers 58B and 58C have respective phototransistors, each of which is adapted to output an analog signal corresponding to the quantity of received light. The analog signal is input to the multiplexer 32. Signals from the light receivers 58B and 58C corresponding to the respective spot detection units 54 are scanned while being changed over by the multiplexer 32 and are then converted into digital signals by the A/D converter 34 before being supplied to the input interface 38. It is to be noted that the film density detector may be constituted by an image sensor.

The frame edge judging method will now be described.

Figure 4:
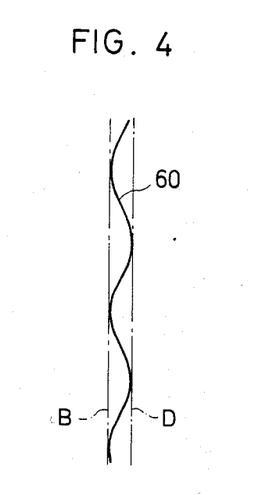
FIGS. 4, 5 and 6 are views employed to describe the film frame edge judging method in accordance with the embodiment.

As will be clear from FIG. 4 which is an enlarged view of a frame edge 60, the latter is not formed in a straight line. When an image is present on the right-hand side of the frame edge 60 as viewed in FIG. 4, the signal data train or bit pattern obtained from the light receivers 58A changes as the film 12 moves as follows: for example, A (0 0 0 0 0), B (0 1 0 1 0), C (1 1 0 1 0) and D (1 1 1 1 1). In this case, the OR (logical sum) of the data train or bit pattern changes in the following manner: 0, 1, 1 and 1. In this case, therefore, the position B is an OR changing position. On the other hand, the AND (logical product) of the data train or bit pattern changes in the following manner: 0, 0, 0 and 1. In this case, therefore, the position D is an AND changing position. Thus, when the distance between the OR changing position B and the AND changing position D is within a predetermined value, it is possible to judge the AND changing position D to be a frame edge.

It is to be noted that the OR changing position or an intermediate position between the OR changing position and the AND changing position may be judged to be a frame edge.

Figure 5:
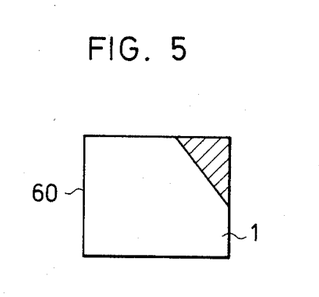
Figure 6:
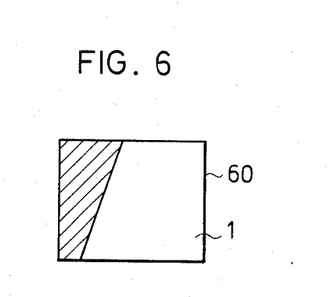

Accordingly, even when the density of a portion (shaded portion) at one of the frame edges is extremely low as shown in FIG. 5 or 6 so that it is not possible to discriminate that frame edge from the background or the remaining portion of the film, it is possible to decide the frame position by discriminating the other frame edge.

The following is a description of the method of making judgement as to whether or not an image carried by a frame is out of focus.

In this method, the transmittance or transmission density of an image recorded on a photographic film is successively measured by a scanning operation which employs two photometric systems which are different from each other in the measuring area, and any image which is out of focus is judged to be defective in accordance with the relationship between the frequency distribution of differences between the values of two kinds of transmittance or transmission density obtained and a contrast value obtained by totalling local contrast values of the image all over the surface of the film frame.

Incidentally, it is general for the focal point of an imaging lens to be adjusted such that a principal object will be recorded clearly, and it is experientially known that a principal object is located in the substantially central portion of the frame. Therefore, in the case of a photographic film exposed by an amateur, it is preferable to scan the central portion of a frame when making judgement as to whether or not the image is out of focus.

The out-of-focus image judging method will be described hereinunder in detail with reference to the drawings.

Figure 7:
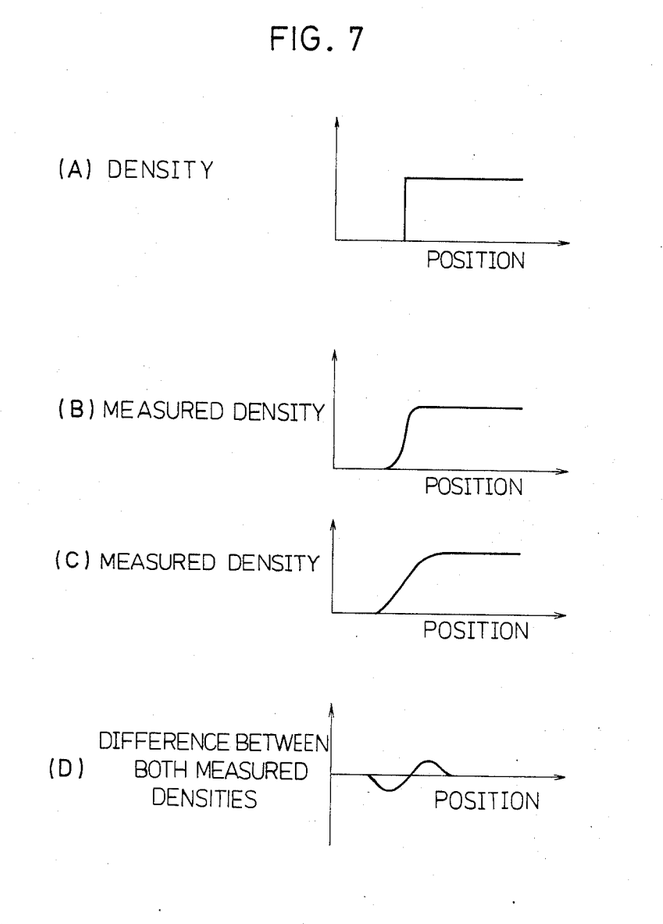
FIGS. 7(A) to 7(D) are graphs showing a clear image, the measured density in relation to the clear image, and the measured density difference.
Figure 8:
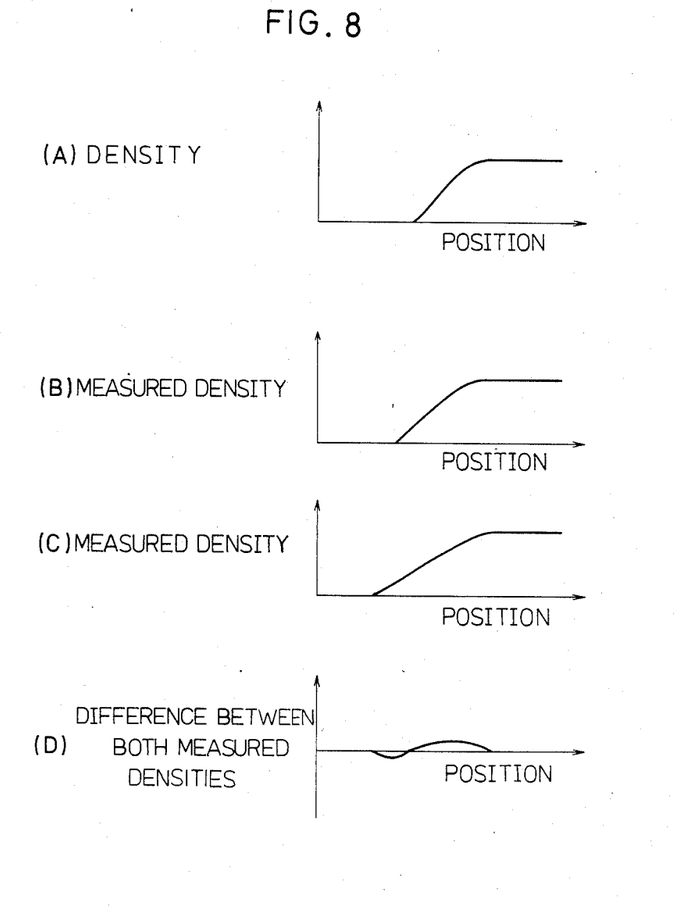
FIGS. 8(A) to 8(D) are graphs corresponding to FIGS. 7(A) to 7(D) in regard to an out-of-focus image.

Referring to FIGS. 7(A) to 7(D) which show the measured density of a clear image, the edge image of a clear image has a relatively large density gradient, such as that shown in FIG. 7(A). This original image is scanned and measured by employing two photometric systems different from each other in the measuring area (light-receiving area). As a result, the density measured by the use of the photometric system with a smaller measuring area is such as that shown in FIG. 7(B), while the density obtained by employing the photometric system with a larger measuring area shows a curve with a gentle slope, such as that shown in FIG. 7(C). In this case, the measuring area of the photometric system which has a smaller measuring area is about 0.1 to 0.3 mm square in terms of the area on the original image, while the measuring area of the photometric system which has a larger measuring area is about 1 mm square.

Figure 9:
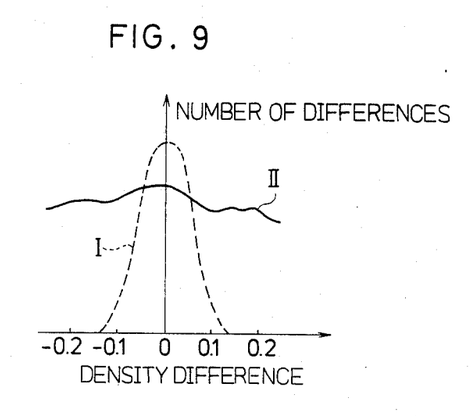
FIG. 9 shows respective frequency distribution curves in relation to the clear image and the out-of-focus image.

The difference between the densities measured by the two photometric systems different from each other in the measuring area shows a curve such as that shown in FIG. 7(D). Since a clear image generally has a large difference between the densities measured by the two photometric systems, the amplitude of the curve in relation to a clear image takes a relatively large value. Such a density difference is sampled with respect to the entire area of a frame, and a frequency distribution curve is drawn on a graph in which the density difference is represented by the axis of abscissa and the number of density differences is plotted along the axis of ordinate. The result is a characteristic curve I such as the one shown in FIG. 9.

On the other hand, FIGS. 8(A) to 8(D) show the results of measurement of an out-of-focus image of the same object as that mentioned in relation to FIG. 7. Since an out-of-focus image has a gentle density change at its edge portion, the density gradient thereof is such as that shown in FIG. 8(A). If the density of this edge image is measured by employing two photometric systems different from each other in the measuring area, both the respective density gradients show gentle curves such as those shown in FIGS. 8(B) and 8(C). The difference between the densities respectively measured by the two photometric systems is therefore relatively small, such as that shown in FIG. 8(D). If the measured density differences are sampled and a frequency distribution curve is obtained in a manner similar to the above, the result is a characteristic curve II such as that shown in FIG. 9. As will be clear from the characteristic curves I and II in FIG. 9, there is a prominent difference between a clear image and an out-of-focus image in terms of the frequency distribution curve. Accordingly, by employing a characteristic value by which such a difference is made clear, it is then possible to detect any out-of-focus image from the characteristic value. However, this method involves the risk of a misjudgement occurring wherein not only an out-of-focus image but also the following types of image may be judged to be out of focus: a low-contrast pattern which has a small difference between the maximum and minimum densities, and an image of a flat density, that is, an image which has no edge with a large contrast at any portion thereof throughout the frame.

In view of the above, according to this out-of-focus image judging method, judgement is made from the comprehensive point of view by combining information corresponding to the contrast of each of the edges present throughout the frame to the frequency distribution of density differences.

Figure 10:
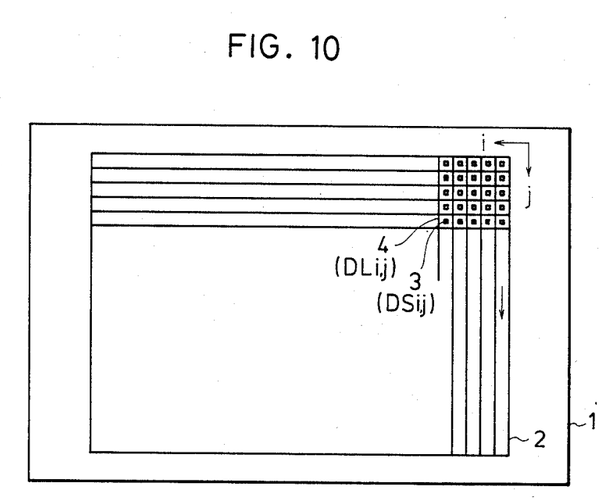
FIG. 10 shows the way in which an image is scanned by the photosensor.

FIG. 10 shows the relationship between a scanning region 2 with respect to a negative film frame 1 which is scanned by the two photometric systems employed in the present invention and small picture elements 3 and large picture elements 4 concentrical with the corresponding small picture elements 3 which represent the sampling positions within the region 2. The small and large picture elements 3 and 4 are arranged such that photometry is effected at the same sampling point on the negative film frame 1 with two kinds of spot size, that is, large and small spot sizes. Measurement is carried out all over the scanning region 2 by effecting scanning in, for example, the vertical direction, that is, from the upper side toward the lower side as viewed in FIG. 10, while successively changing over the columns (i) from one to another. Assuming now that the measured density of the small picture element 3 located in the column i and the row j is represented by DSi,j and the measured density of the large picture element 4 in the column i and the row j is represented by DLi,j, the difference $\Delta Di,j$ between the small and large picture elements is obtained as follows:

$$\Delta Di,j = |DLi,j - DSi,j| \quad (1)$$

Figure 11:
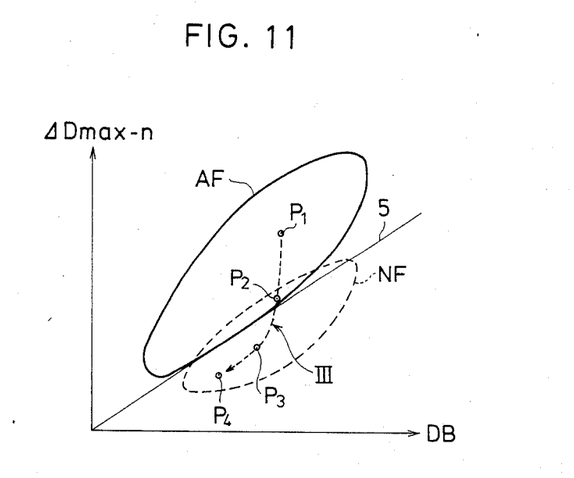
FIG. 11 is a graph showing how an image is judged to be in or out of focus.

Then, the value $\Delta Dmax.n$, which is at the n th position (n represents any number from 1 to m/2) counted from the maximum value among the differences $\Delta Di,j$ obtained in relation to the whole number of picture elements (e.g., m number), is taken as a representative and plotted along the axis of ordinate, such as that shown in FIG. 11. Then, the total sum DB of the absolute values of the density differences at the sampling points which are vertically and horizontally adjacent to each of the small or large picture elements 3 or 4 is obtained according to the following formula:

$$DB = \sum_{i,j} |DLi,j - DLi+1,j| + \sum_{i,j} |DLi,j - DLi,j+1| \quad (2)$$

or $$DB = \sum_{i,j} |DSi,j - DSi+1,j| + \sum_{i,j} |DSi,j - DSi,j+1| \quad (3)$$

Thus, the value DB obtained through the above formula (2) or (3) is plotted along the axis of abscissa, as shown in FIG. 11. As a result, negative film frames which carry images which are in focus are distributed as shown by the area AF in FIG. 11, while frames which carry images which are out of focus are distributed as shown by the area NF. This is because the value DB represents the total sum of local contrast values for an image and therefore increases as the degree of contrast increases, while the density difference $\Delta Dmax.n$ represents the intensity of an edge of the image pattern. Accordingly, it is possible to previously obtain a boundary line 5 employed to make judgement as to whether or not an image is out of focus from the area AF including the frames which carry in-focus images and the area NF including the frames which carry out-of-focus images. Thus, it is possible to immediately and readily make judgement as to whether or not a negative film frame concerned is out of focus by checking the $\Delta Dmax.n - DB$ characteristic point P of this frame with reference to FIG. 11. It is to be noted that, if the degree whereby an image is out of focus is gradually increased with respect to the same image pattern, then a characteristic curve III such as that shown in FIG. 11 is obtained. In other words, at the point $P_1$, the image is in focus; at the point $P_2$, it is at the boundary between being in focus and out of focus; and at the points $P_3$ and $P_4$, it is completely out of focus.

Incidentally, as to the spot sizes of the large and small picture elements, it is practical to select them to be, for example, 1 mm square and 0.1 to 0.3 mm square, respectively, in the case of a 35 mm negative film. However, if the spot size of the small picture elements particularly is made smaller, then the out-of-focus image judging method becomes effective even in respect of a minute image pattern. Additionally, it is preferable to employ a shorter interval for sampling the photometric values obtained by scanning. A practical sampling interval is such that a large picture element is not repeatedly scanned during one photometric sampling operation. It is desirable for sampling to be uniformly carried out over the whole frame or to be performed more finely at the central portion of the frame. Although in the above-described example the axis of ordinate of the graph shown in FIG. 11 represents the density difference value located at the n th position counted from the maximum among the density differences $\Delta D_{i,j}$, the value plotted along the axis of ordinate may be a mean of the density differences from the maximum to the value located at the n th position counted from the top. Further, as to the contrast value plotted along the axis of abscissa, it is possible to employ the difference between the densities respectively measured at measuring points which are adjacent to each other and which are sampled at proper intervals with respect to each other, for example, as follows:

$$DB = \sum_{i,j} |DL_{i,j} - DL_{i+n,j}| + \sum_{i,j} |DL_{i,j} - DL_{i,j+1}| \quad (4)$$

where n=2, 3, 4 . . . Alternatively, more simply, the difference between the maximum and minimum values among the density difference values $DL_{i,j}$ or $DS_{i,j}$ may be employed.

As described above, the out-of-focus image judging method makes it possible to reliably detect an out-of-focus image on a photographic film for even a low-contrast or flat-density negative film frame, since, according to this method, judgement is made as to whether or not an image is out of focus from the relationship between the frequency distribution of density differences and the total sum of local contrast values. The reason why it is possible to properly make judgement on even a low-contrast or flat-density frame is that such a negative film frame involves a small density difference and at the same time a small total sum of local contrast values and therefore the ratio therebetween converges within a certain range in accordance with the degree whereby the image is out of focus and regardless of the image pattern. Further, since measurement data is handled in a two-dimensional manner, it is possible to easily effect an out-of-focus image judging operation irrespective of the directional property of an edge present in the image.

Description will now be made on flow charts for the subroutine shown in FIGS. 13 to 16 corresponding to a program stored in the ROM 42. It is to be noted that the main routine, not shown, is arranged such as to initialize the RAM 44 and to output a pulse motor driving signal to the pulse motor driving circuit 50 (the pulse motor 22 is driven only when the signal is ON).

This subroutine is started when a request is generated to interrupt the CPU 40 by the rise of the pulse signal supplied from the pulse generator 24.

Figure 13:
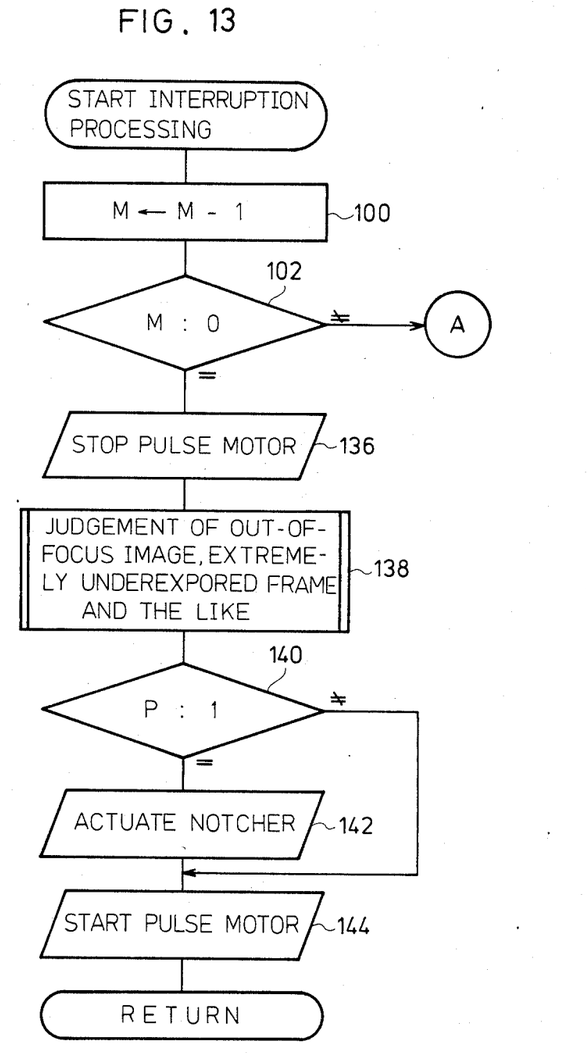
FIGS. 13 to 16 are flow charts corresponding to a program stored in the ROM shown in FIG. 1.
Figure 14:
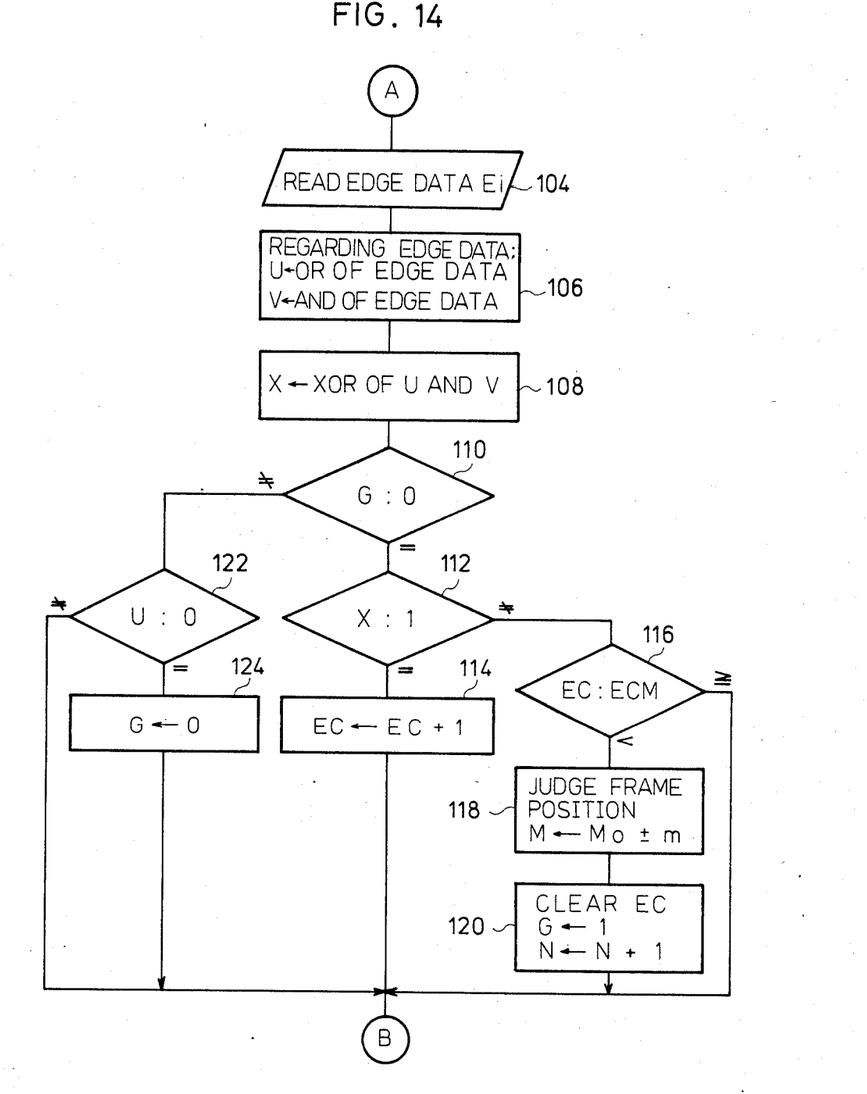
Figure 17:
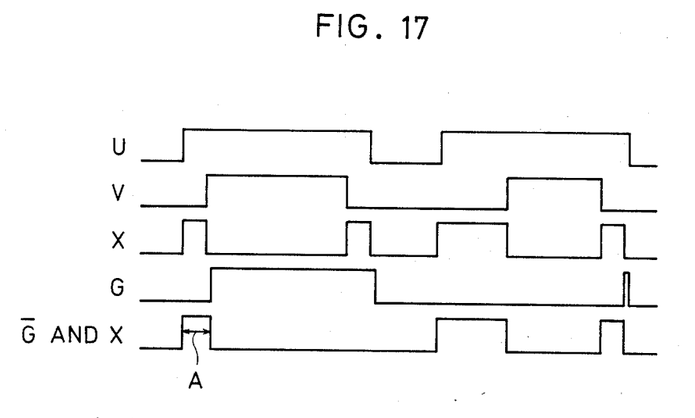
FIG. 17 is a timing chart employed to describe the above-described flow charts.

In a step 100 shown in FIG. 13, the value of M is decremented. The value of M represents a notch forming position. The arrangement is such that, when M=0 and the frame concerned needs to be printed, the notcher 30 is actuated. The intial value for M is, for example, zero. Then, the route to be taken is decided according to the value of M in a step 102. When M≠0, the process proceeds to a step 104 shown in FIG. 14, where edge data Ei (i=1 to r) is read from the light receivers 58A. The value of Ei is either 1 or 0. Ei takes the value 1 when the quantity of received light is less than a predetermined value, that is, when the film density exceeds a predetermined value. Then, the OR (logical sum) U and the AND (logical product) V are obtained for each Ei (i=1 to r) in a step 106. Thereafter, the XOR (exclusive OR) X of U and V is obtained in a step 108. The respective values of U, V and X change as shown in a time chart of FIG. 17 as the film 12 is conveyed.

When G=0 (a step 110) and X=1 (a step 112), an edge discrimination counter EC is incremented in a step 114. In this case, G takes the value 1 when the N th frame edge has already been judged and the value 0 when the judgement has not yet been made. Further, the counter EC is adapted to count the number of pulses from the pulse generator 24 thereby to obtain the pulse width A shown in FIG. 17 at the time when G=0 and X=1. The respective initial values for G and EC are 0.

Figure 12:
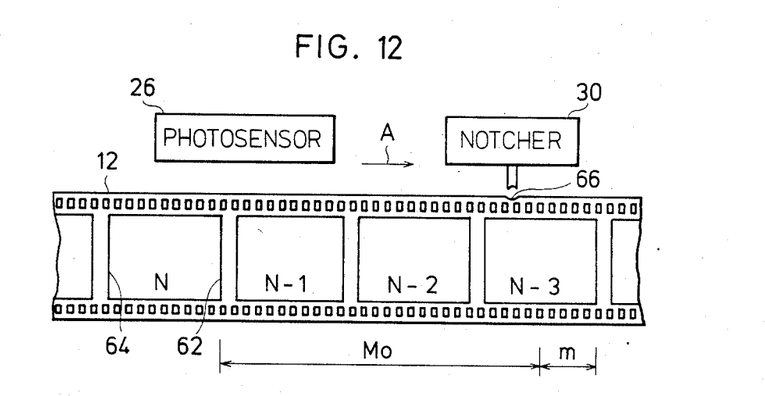
FIG. 12 shows how a notch forming position is decided.

When G=0 and X=0, that is, when the counting for obtaining the width A is completed, the route to be taken is decided in a step 116 according to whether or not the value of EC is smaller than a predetermined value ECM. When EC<ECM, a frame edge is declared, and the notch forming position M is determined in a step 118. For instance, as shown in FIG. 12, when the right-hand side edge 62 (as viewed in FIG. 12) of the N th frame is judged to be a frame edge, $M_0+m$ is set for the value of M, where $M_0$ represents the distance between the photosensor 26 and the notcher 30 and the value of m represents a dimension equal to a half of the length of each frame in the longitudinal direction of the film 12. The units of $M_0$ and m represent a distance corresponding to one pulse generated by the pulse generator 24, that is, the distance between the respective centers of the two adjacent optical fibers 56. If the edge 62 is unclear and consequently the edge 64 opposing the edge 62 is judged to be a frame edge, $M_0-m$ is set for the value of M.

Then, the edge discriminating counter EC is cleared in a step 120, and the value 1 (representing the completion of the edge judgement) is set for the value of G and, further, the value of N (representing the N th frame) is incremented.

When G=1 (the step 110) and U=0 (a step 122), 0 is set for the value of G. In other words, when the edge judgement has already been completed and the OR of the edge data becomes 0, the value of G is set at 0 which represents the fact that the edge judgement has not yet been completed, thereby making ready for a subsequent frame edge judgement.

Figure 15:
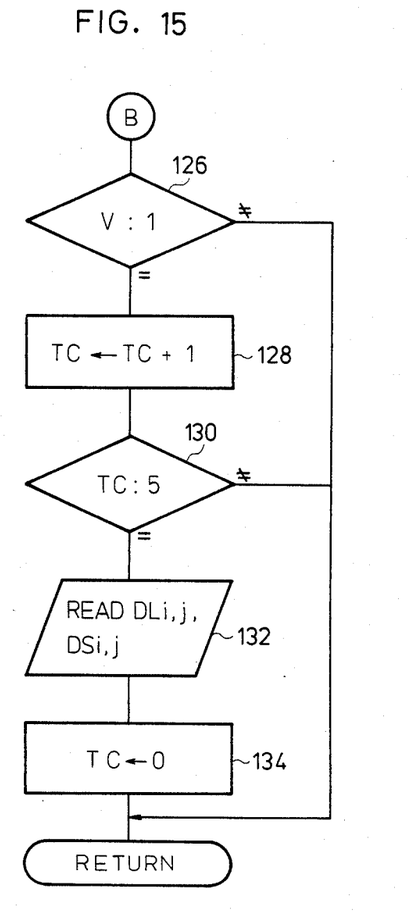
Figure 16:
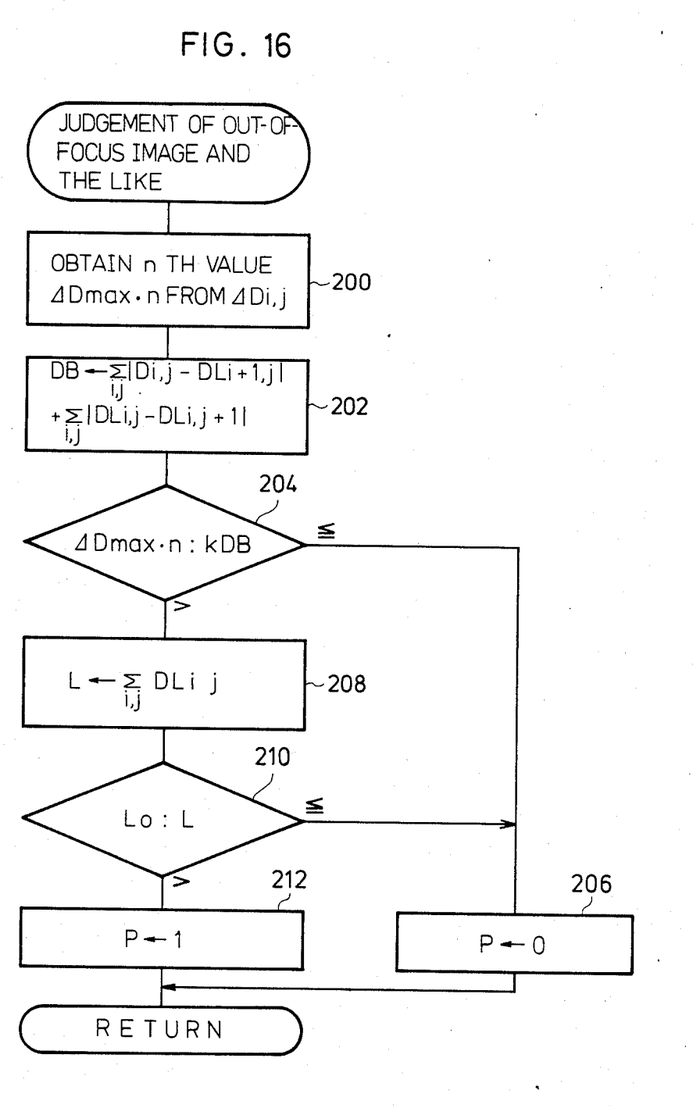

When the processing of either the step 114, 120 or 124 has been completed, out-of-focus image data is read out, as shown in FIG. 15. More specifically, when the value of the AND (logical product) V of the edge data is 1 (a step 126), the value of a read timing counter TC is incremented in a step 128. This timing counter TC is provided in order to read the densities $DL_{i,j}$ of the large spots without any repetition of measurement at the same measuring point and with close proximity to each large spot, since the optical fibers 56 which in combination constitute the large-spot detection portion 54C are, as shown in FIG. 3, disposed in rows, five by five, in the longitudinal direction of the film 12 (the distance between the respective centers of the two adjacent optical fibers 56 corresponds to one pulse supplied from the pulse generator 24). The initial value of the timing counter TC is set at 4. When the value of the counter TC is 5 (a step 130), the respective densities $DS_{i,j}$ and $DL_{i,j}$ of the small and large spots are scanned by the multiplexer 32 in a step 132 thereby to read data for one of the columns shown in FIG. 10. Then, the value of the read timing counter TC is cleared in a step 134.

When V=0 (the step 126), or when TC≠5 (the step 130), or when the processing of the step 134 has been completed, the interruption processing which has been started by the rise of the pulse signal from the pulse generator 24 is ended.

When M=0 in the step 102 shown in FIG. 13, the process proceeds to a step 136, where the signal output to the pulse motor driving circuit 50 is made OFF so as to stop the pulse motor 22. It is to be noted that a single variable M is employed in this embodiment for the purpose of simplifying the description. In practice, however, there are variables which respectively correspond to the N th, N-1 th, N-2 th and N-3 th frames shown in FIG. 12, and the above-described processing is carried out with respect to each of the variables.

Then, judgement is made in a step 138 as to whether or not an image is out of focus and as to whether or not a frame is extremely underexposed. This judgement is made on the data about the N-3 th frame stored in the RAM 44 (in which storage areas are respectively secured for data corresponding to the N th to N-3 th frames). The judgement of an out-of-focus image and the like is carried out according to the flow chart shown in FIG. 16.

More specifically, ΔDmax.n is obtained in a step 200 from the density differences ΔDi,j calculated through the formula (1) as described above. Then, the value of DB in the formula (2) is obtained in a step 202. A comparison is made in a step 204 between ΔDmax.n and kDB thereby to decide the route to be taken. In this case, k is a constant value, and when Dmax.n=kDB, the measuring point is on the boundary line 5 shown in FIG. 11. When ΔDmax.n≦kDB, 0 is set for P (P=0) (a step 206). When P=1, it represents the fact that the frame needs to be printed; when P=0, it represents the fact that the frame need not be printed.

When ΔDmax.n>kDB, the total sum L of the density differences 66 Di,j in order to make judgement as to whether or not the frame is extremely underexposed (a step 208). When the value of L is smaller than a predetermined value $L_0$ (a step 210), the frame is judged to be extremely underexposed, and 0 is set for P (P=0) (the step 206). When the value of L is not smaller than the value $L_0$, 1 is set for P (P=1) (a step 212). When the processing of either the step 206 or 212 has been completed, the judgement of an out-of-focus image and the like is ended.

When P=1 (the step 140 shown in FIG. 13), the notcher 30 is actuated such as to form a notch 66 (see FIG. 12) on the film 12 (a step 142) When the processing of this step 142 has been completed, or when P=0 (the step 140), the signal output to the pulse motor driving circuit 50 is made ON thereby to actuate the pulse motor 22. Thus, the interruption processing is ended. The process then returns to the main routine, not shown, and a subsequent interruption request is awaited.

Thus, a notch is formed on the film 12 by the notcher 30 only for a frame which needs to be printed. Consequently, any frame which need not be printed, such as one which carries an out-of-focus image or involves other kinds of defect, is favorably prevented from being subjected to printing effected by an automatic printer (not shown).

What is claimed is:

1. A method of judging a film frame position on a film, comprising of steps of:
   (a) detecting film densities at plural locations across the width of the film at positions along the film length by a plurality of sensors disposed such as to be orthogonal to the direction in which a film is conveyed; and
   (b) producing binary signals corresponding to the film densities at each of said plural locations, said binary signals assuming either a first binary level in response to a light location or a second binary level in response to a dark location;
   (c) at each of said positions determining the logical sum (OR) of the binary signals which correspond to the densities at the plural locations of the position;
   (d) at each of said positions determining the logical product (AND) of the binary signals which correspond to the densities at the plural locations of the position;
   (e) determining the positions at which said logical sum changes value and said logical product changes value;
   (f) determining the distance between a position at which the logical sum changes value and a position at which the logical product changes value;
   (g) declaring a frame edge when said distance is within a predetermined value;
   whereby it is possible to judge a frame position by detecting only one of the frame edges and it is possible for a frame position to be judged with high accuracy.

2. A method of judging a film frame position according to claim 1, wherein said distance is obtained as a film feed distance at the time when the XOR (exclusive OR) of said OR and said AND is 1.

3. A method of judging a film frame position according to claim 1, wherein, when it is judged that one of the frame edges orthogonal to the film conveying direction is not present, the other edge is detected, and a film frame position is thereby judged.

4. A method of judging a film frame position according to claim 1, wherein said step of declaring a frame edge includes judging the position where said OR changes value to be frame edge.

5. A method of judging a film frame position according to claim 4, wherein said plurality of sensors output light/dark binary signals according to whether or not the detected film densities exceed a predetermined value.

6. A method of judging a film frame position according to claim 5, wherein the detection of said film densities is effected in such a manner that the light passing through said film is received by one of the end faces of each of said plurality of sensors constituted by a group of optical fibers, and the quantity of light passing through said film and emerging from the other end face of each of said optical fibers is detected and converted into an electric signal by a light receiver.

7. A method of judging a film frame position according to claim 4, wherein the detection of said film densities is effected by a plurality of sensors constituting an image sensor.

8. A method of judging a film frame position according to claim 1, wherein said step of declaring a frame edge includes judging the position where said AND changes value to be a frame edge.

9. A method of judging a film frame position according to claim 8, wherein said plurality of sensors output light/dark binary signals according to whether or not the detected film densities exceed a predetermined value.

10. A method of judging a film frame position according to claim 9, wherein the detection of said film densities is effected in such a manner that the light passing through said film is received by one of the end faces of each of said plurality of sensors constituted by a group of optical fibers, and the quantity of light passing through said film and emerging from the other end face of each of said optical fibers is detected and converted into an electric signal by a light receiver.

11. A method of judging a film frame position according to claim 8, wherein the detection of said film densities is effected by a plurality of sensors constituting an image sensor.

12. A method of judging a film frame position according to claim 1, wherein said step of declaring a frame edge includes judging an intermediate position between the positions where said OR and said AND respectively change value to be a frame edge.

13. A method of judging a film frame position according to claim 12, wherein said plurality of sensors output light/dark binary signals according to whether or not the detected film densities exceed a predetermined value.

14. A method of judging a film frame position according to claim 13, wherein the detection of said film densities is effected in such a manner that the light passing through said film is received by one of the end faces of each of said plurality of sensors constituted by a group of optical fibers, and the quantity of light passing through said film and emerging from the other end face of each of said optical fibers is detected and converted into an electric signal by a light receiver.

15. A method of judging a film frame position according to claim 12, wherein the detection of said film: densities is effected by a plurality of sensors constituting an image sensor.

16. A method of automatically judging a frame position on a developed negative film, comprising the steps of:

(a) disposing a photosensor in such a manner that a plurality of spot detection portions of said photosensor are orthogonal to the direction in which said film is conveyed;

(b) detecting film density at locations on the film in registration with each of said spot detection portions at each of several positions along the length of the film; and (c) producing binary signals corresponding to the film densities at each of said plural locations; said binary signals assuming either a first binary level in response to a light location or a second binary level in response to a dark location;

(d) at each of said several positions determining the logical sum (OR) of the binary signals which correspond to the densities of the locations of the film in registration with said spot detection portions at the position;

(e) at each of said several positions detetermining the logical product (AND) of the binary signals which correspond to the densities of the locations on the film in registration with said spot detection portions at the position;

(f) determining the positions at which said logical sum changes values, and said logical product changes value;

(g) determining the distance between a position at which the logical sum changes value and a position at which the logical product changes value;

(h) declaring a frame edge when said distance is within a predetermined distance value, said frame edge being judged to be at the position where said logical product changes value;

whereby it is possible to judge a frame positon by detecting only one of the film frame edges, and it is possible for a film frame position to be judged with high accuracy.

17. A method of judging a film frame position according to claim 16, wherein, when it is judged that one of the frame edges orthogonal to the film conveying direction is not present, the other frame edge is detected, and a film frame position is thereby judged.

18. A method of judging a film frame position according to claim 17, wherein said photosensor outputs a light/dark binary signal according to whether or not the detected film density exceeds a predetermined value.

19. A method of judging a film frame position according to claim 18, wherein the detection of said film density is effected in such a manner that the light passing through said film is received by one of the end faces of said photosensor constituted by a group of optical fibers, and the quantity of light passing through said film and emerging from the other end face of said photosensor is detected and converted into an electric signal by a light receiver.

20. A method of judging a film frame position according to claim 17, wherein the detection of said film density is effected by said photosensor constituting an image sensor.

* * * * *